United States Patent [19]
Drinkwater et al.

[11] Patent Number: 5,712,731
[45] Date of Patent: Jan. 27, 1998

[54] SECURITY DEVICE FOR SECURITY DOCUMENTS SUCH AS BANK NOTES AND CREDIT CARDS

[75] Inventors: Kenneth J. Drinkwater, Surrey; Philip M. G. Hudson, Wiltshire, both of United Kingdom

[73] Assignee: Thomas De La Rue Limited, London, United Kingdom

[21] Appl. No.: 549,681

[22] PCT Filed: May 10, 1994

[86] PCT No.: PCT/GB94/01006

§ 371 Date: Jan. 2, 1996

§ 102(e) Date: Jan. 2, 1996

[87] PCT Pub. No.: WO94/27254

PCT Pub. Date: Nov. 24, 1994

[30] Foreign Application Priority Data

May 11, 1993 [GB] United Kingdom ............... 9309673

[51] Int. Cl.⁶ .................................................. G02B 27/10
[52] U.S. Cl. ........................... 359/619; 359/622; 359/623

[58] Field of Search .................................. 359/619, 626, 359/622, 623

[56] References Cited

U.S. PATENT DOCUMENTS

| | | | |
|---|---|---|---|
| 3,860,955 | 1/1975 | Shinozaki | 358/44 |
| 4,509,824 | 4/1985 | Yamasaki et al. | 359/619 |
| 4,765,656 | 8/1988 | Becker | 283/70 |
| 4,892,336 | 1/1990 | Kaule | 283/91 |
| 5,363,240 | 11/1994 | Miyashita | 359/625 |

FOREIGN PATENT DOCUMENTS

| | | |
|---|---|---|
| 203752 | 12/1986 | European Pat. Off. . |
| 215672 | 3/1987 | European Pat. Off. . |

*Primary Examiner*—David C. Nelms
*Assistant Examiner*—Ricky Mack
*Attorney, Agent, or Firm*—Oliff & Berridge, P.L.C.

[57] ABSTRACT

A security device includes an array of microimages which, when viewed through a corresponding array of substantially spherical microlenses, generates a magnified image. In some cases, the array of microlenses is bonded to the array of microimages.

46 Claims, 4 Drawing Sheets

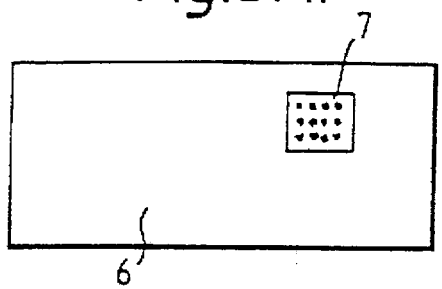
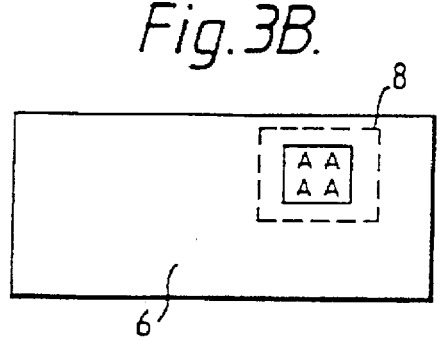
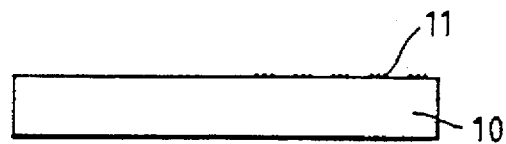
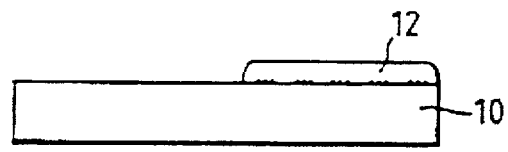
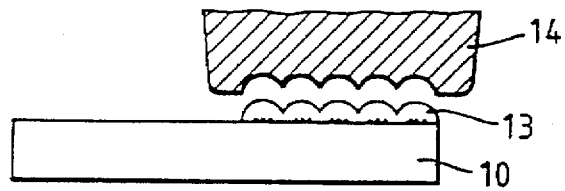
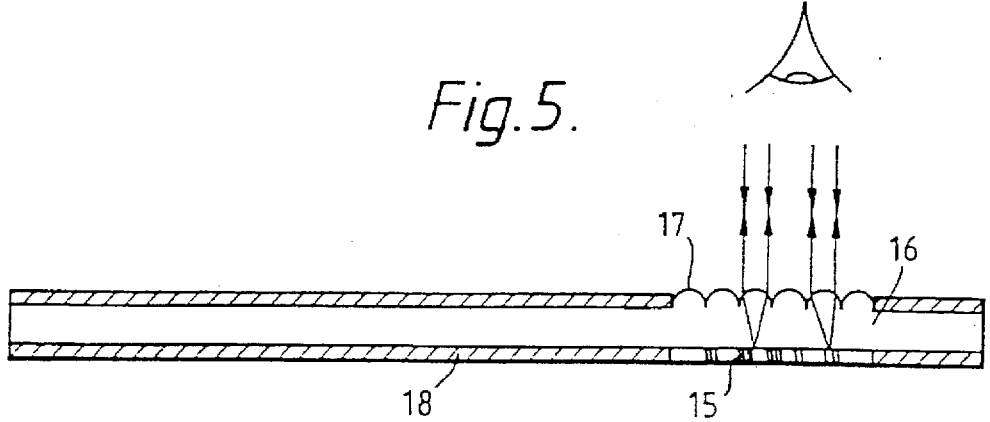

SECURITY DEVICE FOR SECURITY DOCUMENTS SUCH AS BANK NOTES AND CREDIT CARDS

The invention relates to a security device and methods of making such security devices.

BACKGROUND OF THE INVENTION

Many different proposals have been made in the past for designing security devices for affixing to security documents such as banknotes, credit cards and the like to assist in authenticating such security documents during their use. Typical examples, include holograms and other optical variable devices.

One particular type of security device which has been used for many years is the security thread. Recently, in U.S. Pat. No. 4,892,336, a development of the security thread device was described. In this case, the security thread was provided as a transparent substrate, one side of which carried a set of lenses and the other side of which carried microprinting which could be viewed through the lenses. Typically, the microprinting comprises strips of different colours such that when the thread is viewed at different angles, different colours will be perceived. One of the problems with this approach is the need for a very precise register between the microlenses and printing. In fact, in U.S. Pat. No. 4,892,336 this need for precise register is put forward as one of the advantages of that invention in that it makes it very much more difficult to counterfeit such security devices. On the other hand, for a security device to be useful commercially, genuine devices must be relatively easy to manufacture since otherwise production costs will be prohibitive.

U.S. Pat. No. 4,765,656 also describes a security device made using a lenticular screen and in this case the microimages are formed by direct laser writing through the microlenses which are already in situ in the device. Again, this approach is not suited to mass production techniques although it does achieve exact register between the lenses and images.

SUMMARY OF THE INVENTION

In accordance with one aspect of the present invention, a security device comprises a regular two dimensional array of substantially identical printed microimages, each having a dimension up to about 250 µm and which, when viewed through a two dimensional array of substantially spherical microlenses having substantially the same pitch as the microimage array, each microlens having a diameter in the range substantially 50–250 µm, generate one or a number of magnified versions of the microimage depending on the extent to which the array of microimages and the array of microlenses are in register.

We have realised that a new security device can be constructed which is suited to mass production techniques by utilising the effects of a two dimensional array of spherical microlenses.

Generally, each microlens will have identical optical properties. The viewing condition also assumes that the microimage objects are situated near the focal plane of the microlenses. In a first "ideal" example of this system, the pitches of the images and lenses are identical and the two are accurately aligned and the microimages are near the focal planes of the microlenses. When this system is viewed from a given direction each lens images the corresponding point on the image underneath it to form a very highly magnified image of the underlying microimage element. If there is a difference in pitch between the two arrays a set of moire fringes will appear where the repeat element is the object in the array when across the moire fringe successive elements image successive portions of the object to build up an image which will repeat every time the mismatch equals an integer number of lenses. A pitch mismatch between a microlens array and microimage array can also conveniently be generated by angularly misaligning the arrays which will also generate a moire repeating image of the object. It should be appreciated that most of the practical embodiments of this invention will use the misaligned condition of the arrays to form images as this arrangement has particularly advantageous properties.

The term spherical lenses means that the surface form of each microlens approximates to a portion of the surface of a sphere such that the lens has imaging power along two perpendicular axes around its optic axis (which will be normal to the plane of the array). In this case, the lens surface will be curved in both axes perpendicular to the optic axis with both axes having the same curvature. In this case, the lens will form an approximate point image at its focal plane when illuminated with collimated light (neglecting aberrations and small deviations from ideal behaviour due to small deviations of the shape of the lens from the ideal spherical shape). Effectively spherical lenses are the normal form of simple lens which will form a normal image of an object near the focal plane. This is in contrast to cylindrical lenses which only have optical power in one axis and would therefore form a line image when illuminated with collimated light with the light being brought to a focus in one axis but not in the other and in this case the surface profile of the lens would be a portion of the surface of a cylinder with a radius of curvature in one, direction and flat (linear) in a perpendicular direction. By the term astigmatic lens we mean a lens surface profile that is very similar to that of a spherical lens but where the radius of curvature along the two perpendicular optical axes is different such that the lens forms a distorted image, of an object by bringing different perpendicular components of light to focus at different distances. An astigmatic lens illuminated by collimated light would focus the light at different distances in both axes.

Each array would normally consist of many lenses and microimage elements, repeating many times in each direction with a regular pitch. Typically such arrays consist of many (e.g. 100 or more) regularly spaced identical lenses, each typically 50–250 µm in diameter and with a focal length of typically 200 µm. A typical manufacturing process would be to coat a substrate with photoresist, expose this to a mask say a grid or hexagonal pattern) and then develop off the desired areas to leave isolated, regular islands of resist. These are then melted and surface tension in the liquid state causes the formation of an array of spherical islands of resist. From this a microscopic array of spherical structures can be manufactured by known replication processes.

In particular, in contrast to the prior art approaches, many examples of the security device will not include the microlens array. This makes it much easier and cheaper to manufacture than the known devices which incorporate microlens arrays. Also, in contrast to the prior art, we have realised that by using spherical lenses, the need for exact register between the lens array and the microimage array is relaxed which makes systems of combined lens arrays and microimages much easier to manufacture and particularly allows for a manufacturing method utilising established security printing techniques.

Typically, the microimages will have feature sizes down to say 5 or 10 microns. This together with their small size makes the microimages very difficult to reproduce and in particular difficult to see by the naked eye. Consequently, this security device is covert but easy to use.

In some cases the array of microimages will form a single set of substantially identical microimages while in others several such sets are provided, the images of each set being identical with others in the same set but different from other sets. In this latter case, the sets could record different views of an object thus providing a 3D effect when viewed.

The interaction between the analysing array of microlenses and a corresponding set of identical microimages is of a characteristic visual form. When the corresponding arrays are perfectly aligned into register each lens has underneath it a microimage in perfect register so that an observer sees only one magnified image of the microimages. However, as the spherical lens array is rotated relative to the image array the single magnified image splits into a regular array of images with the number of visible images increasing and their individual sizes decreasing as the angular mismatch increases. Essentially on twisting the lens/image arrays off the location of perfect register, the area and unit length over which the lenses and images are in phase to form a visible picture decreases so that the device ceases to display a single image and starts to display an array of much smaller regular images which show the loss of perfect register between the lenses and the microimages. The overlap image areas are essentially determined by the moire pattern formed between the lens and image arrays and so this device has been termed the "moirémagnifier". It is this "moiré" characteristic of the device that means much looser register/alignment constraints are required to form a viewable image than for instance would be the case with previous known systems based on cylindrical lens arrays held in perfect register with micro printing where the image is destroyed when register and tilt alignment are lost. It is anticipated that the majority of security devices would use this form of array of identical or repeated micro images to allow relative positional register tolerances during manufacture to be kept very loose.

In an alternative approach, three-dimensional objects may be recorded with each microimage corresponding to a slightly different view point of the object so that when the microimages are viewed through the corresponding matched lens array positioned in exact register, depth/movement effects will be visible as the viewer changes viewpoint. Note that this 3D image will be pseudoscopic but that techniques exist for reversing the recorded images, for example using retroreflectors, to produce orthoscopic (correct parallax) images.

These depth and movement effects across the image can be used to provide additional effects. The ultimate case becomes a complete "integral photograph". This would be, for example, recorded through a microlens array using a 3D subject (or several spaced apart planar graphical images) to produce an image. Typically at these small sizes the image would not be visible to the unaided eye. Typically such images would involve recording small scale detail, probably down to 5–10μ in width.

However, in the case of a complete integral photograph, perfect alignment is required between the lens array and the corresponding images to view the result and the image would not be visible without this. Therefore, although this type of image is possible it is anticipated that this form of device is unlikely to be used for printed or mass produced security devices because the register tolerances for image formation would be much higher than for the case of repeated simpler microimages where moiréeffects would occur on misalignment allowing much looser register constraints for image visibility.

It will be appreciated that an important aspect of this invention is that the microimages are printed, e.g. with ink. This makes the device particularly suitable for mass production.

In accordance with a second aspect of the present invention, a method of preparing a record medium for use in producing a security device comprises imaging an object or image onto a record medium through a regular two dimensional array of substantially spherical microlenses, each microlens having a diameter in the range substantially 50–250 μm, so as to record a two dimensional array of substantially identical microimages, each having a dimension of up to about 250 μm and substantially the same pitch as the microlens array. The record medium may itself constitute or can form a printing plate or it can be used to replicate the resultant, recorded microimages onto a printing plate.

In one example a microlens array forms a set of microimages on a material which is then used to form a printing plate. This pattern is then printed onto a document as an array of tiny structures, of a size just above that of print resolution e.g. 5 to 10μ up to about 100μ but which are not individually visually discernible. This array could then subsequently be decoded using a microlens array similar to that used originally in manufacture. The creation of such a precisely spaced set of microimages would be very difficult using current techniques such as engraving and photo techniques. Yet certain print techniques themselves such as lithography or intaglio, can resolve down to around 5μ to enable such a structure to be printed from a printing plate.

These developments therefore relate to the creation of new microimaged security features which may be printed. In all cases the microimages will be viewed through matched, corresponding microlens arrays and in all cases either the viewing itself or more sophisticated multiple image or lenticular techniques can produce visually distinct movement, depth and image "switching" i.e. abrupt change of the perceived image as a result of a change of the viewing angle, effects.

In other examples, an object could be imaged onto a substrate carrying photoresist which is then processed in a conventional manner to generate a printing plate.

In most of the examples described so far, the security device does not include a corresponding array of microlenses. However, in accordance with a third aspect of the present invention, a method of manufacturing a security device comprises printing a regular two dimensional array of substantially identical microimages on a record medium, each having a dimension up to about 250 μm; and securing over the array of microimages, a two dimensional array of substantially spherical microlenses having substantially the same pitch as the microimage array, each microlens having a diameter in the range substantially 50–250 μm, such that on viewing, one or a number of magnified versions of the microimage, depending on the extent to which the array of microimages and the array of microlenses are in register, is seen.

In this case, a security device is provided comprising combined microimages and microlenses. However, this method is particularly suited to mass production since the tolerance with which the microlenses need to be registered with the microimages is much wider than has previously been possible. Typically, the allowable tolerance during the securing step between the arrays of microimages and microlenses is in the range 0.25–0.5 mm.

In this case, the printed microimages and the viewing microlens array are integrated together as a public recognition security feature which would produce an approximation of the kind of optically variable effects, depth perception effects, parallax movement effects and rapid holographic image changes associated with white light interfering structures such as multiple alternating layers of metal, dielectric coatings, or white light diffracting effects such as are exhibited by surface relief pattern forming holograms and computer generate diffraction patterns such as the Kinegram of Landis and Gyr.

A particularly important application of the invention provides a security device in accordance with a fourth aspect of the invention comprising an optically variable device exhibiting an optically variable image, the device further including a two dimensional array of substantially identical microimages each having a dimension up to about 250µm and which, when viewed through a two dimensional array of substantially spherical microlenses having substantially the same pitch as the microimage array, each microlens having a diameter in the range substantially 50–250 µm, generate one or a number of magnified versions of the microimage depending on the extent to which the array of microimages and the array of microlenses are in register.

Typically, the optically variable image will comprise a hologram or diffraction grating, for example a surface relief hologram or a diffraction grating structure such as a Kinegram or a "pixelgram" as made by CSIRO. In general, the microimages will either be printed onto an optically variable device layer or provided as a light diffracting surface relief pattern.

This aspect of the invention involves combining with a standard optically variable device such as a security embossed hologram, an array of tiny integral images e.g. photographs, made and read out using the microlens structures and techniques outlined above.

The gross holographic image thereby provides a first level of public recognition, and thus security.

In use, the optically variable device, such as a hologram, would provide security through being instantly publicly recognisable whilst the small scale microscopic integral images would not be discernible by eye, but would act as a covert feature becoming visible when overlaid by a microlens array (supplied as an embossed plastic film) to reveal the hidden images whether they are of text, graphics or code markings.

This is useful as a security feature because the very small size attainable in integral photographs and by imaging through microlens arrays is very difficult to obtain by printing or photography. It is totally beyond the capability of normal reprographic scanning or printing methods. It is also very difficult to produce entirely holographically. It is too fine for conventional artwork, and anyone succeeding in producing such artwork would be defeated in the holography as the precise imaging of such structures would be extraordinarily difficult if not impossible and such fine lines could not be recorded by masking techniques.

The only way to obtain such a device would therefore be to obtain and use a microlens array identical to that used for manufacture. This is therefore a valuable security device inaccessible to both unauthorised holographers and unauthorised printers.

The hologram and microscopic integral images e.g. photographs would be produced together on a first master embossing plate as detailed below and would then be mass produced by conventional embossed hologram production techniques.

An analysing "viewer" sheet which consists of an array of surface relief microlenses would also be manufactured by embossing or possibly moulding. These viewers could then be distributed to authorised users to allow definitive verification of the hologram.

Preferably in this technique the integral photography stage is performed by imaging down some two dimensional appearance graphics onto a photoresist or other recording medium although this first pattern could also be produced using semiconductor direct writing photomask manufacturing methods. The plate on which the integral photograph is recorded would also be used to record either prior or subsequently a conventional photoresist rainbow hologram or diffraction grating type device as known in the art. This would then combine both the holographic and integral microimages e.g. photographic images into the same surface relief structure. The recombination could also be done by mechanical stamping from individual masters. Note that although we use the term "integral photography" the images recorded are two dimensional and actually much smaller in scale than conventional integral photographs because of the small scale size of the images produced here due to the availability of very small scale lens arrays.

At the origination stage the preferred production technique would consist of two stages in any order:
  A. Record standard hologram into photoresist.
  B. Put microlens array over photoresist at a precise spacing and record a holographic image of the image graphics/logo/3D object.

The photoresist would then be developed.

The microimages would be recorded into areas containing a holographic replay (e.g., diffraction grating, rainbow hologram, 2D/3D hologram or a matt speckled, diffused patch). This would enable holograms to be manufactured containing both standard diffractive structures whose surface relief pattern may have a resolution of around 1 micron and microscopic integral photographs of diameter 10–100µ as distinct areas on the holographic surface. It is also possible to produce similar structures using imaging or other techniques to record the 2D integral photographs as small scale holographic structures in their own right.

The secondary image produced and revealed by the microlens array could take several forms made as follows:
  1. A 2D microimage is made by holographically recording a flat, two dimensional graphic image through the lens array. On viewing, a repeated set of these graphics would be visible: these would show movement effects.
  2. A microimage showing rapid image switching effects as a function of viewing angle, is made by holographically recording several sets of flat graphical artwork through the lens array, at different recording angles. On tilting the device a viewer would see sharp switches between various graphics as alternative images came into view.
  3. A full three dimensional integral "photograph" is made where the object being holographically recorded is three dimensional. Different microlenses record views from different directions of parallax. When the decoding microlens array is in perfect alignment a viewer would see a three dimensional image exhibiting parallax shifts and depth effects on tilting.

The analysing microlens could be a lens structure embossed into a transparent plastic film as discussed. There may also be advantages in using a holographic microlens as the analyser.

This aspect of the invention could be used as a supplementary level of covert security on banknote holograms or other optically variable devices, or plastic cards.

Security devices in which the microimage arrays are printed down onto a document and then the microlens array is formed or fixed on top of the microimage array in order to form a permanently bonded public recognition security feature are particularly appropriate for protecting documents of value for example bonds, cheques, banknotes or plastic cards against counterfeit as the image features are optically variable (e.g. image switches, colour shifts) and the devices and image characteristics cannot be counterfeited or copied using routinely available printing technology such as colour copiers or scanners.

In order to view a security device which does not already incorporate a microlens array, we provide in accordance with a fifth aspect of the present invention a method of authenticating a security device comprising positioning a two dimensional array of substantially spherical microlenses having substantially the same pitch as the microimage array, each microlens having a diameter in the range substantially 50–250 82 m, over the security device, and viewing the security device through the array of microlenses.

The security device would be viewed through the corresponding array of microlenses in order to observe an image. A suitable array of spherical microlenses comprises a clear plastic sheet with the lenses incorporated by roll or flatbed embossing, injection moulding, vacuum forming casting and via curing in a mould as appropriate. In order to verify the security device the array of microlenses would simply be laid on top of the printed or holographic device and rotated. As the lens array and microimage array come into register an array of small identical images would be observed due to the moire phenomenon between the arrays. On perfect alignment a single enlarged magnified image would become visible.

This can be done manually but conveniently, we provide in accordance with a sixth aspect of the invention a security device reader comprising a two dimensional array of substantially spherical microlenses having substantially the same pitch as the microimage array, each microlens having a diameter in the range substantially 50–250 μm; and a security document holder for locating a security document having a security device substantially in register with the array of microlenses such that the security device can be viewed through the microlenses. Typically, the holder and microlens array would be relatively rotatable. The changing arrays of identical images seen as the two arrays are rotated would form a highly characteristic visual security feature.

By using more than one set of microimages, this invention enables an optically variable image switching effect to be achieved using much simpler systems than previously. Consider the case where a set of micro lenses is used to record two arrays of images of objects A and B. The two objects are angularly separated and so record microimages that will only become visible at different view angles. Now suppose the resultant image array is combined with an overlaid lens array to form a security device. The image characteristics of this security device will be that on tilting the device the viewer would see the observed image flip between the two sets of recorded information A or B or multiple images of these depending on the moire interaction between the images and arrays. In the case of a printed document the microimage containing microimages A and B would be printed down at one working, so keeping the exact relative registration between the two microimages and so keeping a defined angular separation and shift. This system could of course cover the case of more than two images recorded, for example several sets of images replaying at different angles used to a progression such as several rings to form an expanding circle pattern or to incorporate simple image movement or progression forming effects similar to those frequently used in multiplex holography where in this case the angular selectivity of the microlens array is being used to encode the various viewing directions to produce image "switches" rather than a hologram. It is known that such obvious image switches produce effective public recognition security devices and are significantly more complex to produce thus providing significantly increased security. This is described in more detail below in connection with FIG. 2.

The simultaneous viewing of two or more sets of different microimage arrays via a lens array can also be used to form a device of colour shifting appearance. Suppose for example the two different microimage sets A and B as above are separately recorded and then each printed separately onto a document in visibly different coloured inks. The security device would then be formed by overlaying this microimage set with a set of matched spherical lenses. In this case a viewer would see on tilting the device an image switch and a predefined colour switch. The angular image switches between different devices would vary because using standard printing techniques the two different coloured microlens arrays would not retain the same relative register device to device. However, the colour shift on switch between the two images would be well defined and constant in all security devices. In this way colour switching security devices could be formed without the need for exact in register print as for cylindrical lenses. The device would simply be defined to operate in a mode utilising the twist error moire effect to produce an array of a few multiple images switching between images of different colour on tilting so that different devices within a manufacturing run would look substantially similar.

In some cases, particularly where the corresponding microlens array is not part of the security device, it is important to prevent the microimage arrays from being back engineered or to make it very difficult to back engineer from the analysing lens arrays that would be distributed in the field as readers.

One preferred method is to use two different lens arrays of related pitches when recording the initial image deliberately chosen to have similar but different pitches, for example, varying by for example 20% (range 5%–50%). The initial array would be recorded by imaging two separate images, say, A and B each through different lens arrays, one for A and one for B, into the same recording material. To form a printed security device the resultant pattern would then be printed onto a document or otherwise reproduced and then overlaid with a microlens array with a suitable twist offset to produce several multiple images by the moire effect. The resultant security device would then display a number of images A, the number and pitch set by the moire interaction between the microimages and analysing array plus an array of images B with a different size, number and pitch depending on the different moire interaction between this microimage array and the corresponding analysing lens array. This image consisting of two different moire generated repeating patterns would be very difficult to back engineer as two lens sets would be required. The analysing lens system could be similar to either of the recording lenses. Depending on the relative periodicities and recorded sizes the resultant image pattern could take a number of forms. The image could consist of two sets of images displaying a slightly different size or number across the array if the relative periodicities are very close. Alternatively the image patterns could display markedly different characteristics for example a few large images A displayed with a large number of small images B, if the lens arrays are of very different periodicities (say 50% different) with the small images B displaying a much faster rate of change and movement with lens twist and view angle. Using this concept it would also be possible to record the formative images A and B separately and then print the images down in separate colours to form a similar effect where two images of different colours display different moire effects and markedly different angular rates of change with the smaller images with a small repeat pitch changing more rapidly with viewing angle.

This invention also provides for another technique where two microimage patterns are again laid down but form an image again with different moire repeats in order to make copying and counterfeit more difficult. In this case both images originate from the same lens array. Both images A and B are then used for different print runs on a document possibly but not essentially using inks of different colours. During printing one array is deliberately twisted out of alignment relative to the other array so that the printed security device consists of two arrays of the same pitch but rotated relative to each other. The same effect could be obtained in a more controlled way by using one master recording with the recorded lens array twisted between exposures. The single recording would provide tight control on relative moire pitches and image sizes, the double recording double print would provide for a colour differential. In this case when viewed with an analysing array either separately from the document or affixed to it the two arrays display images of different sizes and moire repeats. Depending on the twist mismatch angle the differences in image sizes and repeats between the composite images could be large or small, for example a few large image A's combined with a large number of small image B's that would move much more rapidly with tilt.

Another way to make copying or counterfeiting the devices more difficult would be to slightly alter the microlens shapes from near spherical lenses to astigmatic lenses which would have different focal lengths along two different perpendicular axes about the optical axis of the lens. Previously we detailed a microlens manufacturing technique where a photoresist plate coated with a known resist thickness was exposed to a regular rectangular grid pattern or hexagonal pattern (etc). The exposed areas were developed to leave islands of resist and then the resist melted to form substantially spherical lens structures under the influence of surface tension on the liquid meniscus which forms a spherical surface structure. If this technique is slightly altered to use rectangular or elliptical resist areas, then the resist islands will be longer in one axis and when melted would then form surface structures with different radii of curvature along two perpendicular axes. (For this technique to be usable with other aspects of this invention it is important that the pitches between lenses remains constant for both axes). This method would thus form an array of astigmatic spherical lenses on a constant pitch grid but with different focal lengths along different perpendicular axes
with shorter focal lengths along small axes. Such astigmatic lenses could be used during imaging with pre-distorted artwork to compensate for the aberrations to form more secure images. This would make the security devices difficult to back engineer using reader lens arrays available in the field.

Another way to make copying and counterfeiting more difficult is to use coloured lens arrays. Most processes to back engineer lenses would require exposure through the lens array using blue or green light onto a photoresist or similar material to form a printing plate. If the analysis lens array is coloured red and effectively absorbs blue and green light this will make back engineering much more difficult. Likewise covering the analysis lens array with a matrix or set of stripes of red, green, blue would allow images to be visualised in an overlap of colours using white light but would defeat back engineering which would require using substantially single colour light to image through the lens onto high resolution film or photoresist/photopolymer. In this case substantial parts of the spectrum would be blocked by the filter stripes forming only partial images corresponding to the unblocked areas. This would make counterfeit back engineering the microimages using readout lens arrays prohibitively difficult or impossible by ensuring that the counterfeit image quality would be dramatically degraded. A particularly effective and preferred route of permanently colouring the lens array with a red, green, blue set of filters would be print this onto the lens array using dye diffusing inks so that the coloured dyes penetrated some distance into the plastic. The filter could therefore not be removed from the lens array without destroying it.

It is also possible to obtain other kinds of effects to make the device more difficult to copy or counterfeit by using lens arrays consisting of different lens types on different pitched arrays. For example, if two sets of microimages, A and B are recorded through two corresponding lens arrays (A,B) of different "pitches", array A will only register to and replay through corresponding lens array A and array B will only register to and replay through corresponding lens array S. Here lens arrays A and B would be of the same focal length but have different spacings. The microimage arrays A and B are printed interspersed in the same document area. Prior art cylindrical lens based systems would need exact register for the image to be viewable but this approach can use typical printing register (i.e. not within 10 microns or 10's of microns but say within 0.5 mm). The device would be viewed through a lens array that consists of combinations of lens arrays A and B (i.e. areas of A and of B interspersed over small areas either randomly or discretely). If now for example lens arrays A and B have different focal lengths then images A and B will be perceived to move at different apparent rates on tilting, so providing a visual effect where for example, image B moves much faster (e.g. two image repeats to one) than image A. Sets of microimages A and B could also be put in different print colours so that the final image would be a switching effect between say red A's and blue B's, with A's and B's moving at very different apparent rates on tilting.

The advantageous characteristics of all these approaches detailed above are as follows . . .

Exact registration of print and microlenses is not needed, unlike other switching effects using cylindrical microlenses which require precise registration to be effective.

The combined system would be very difficult to reproduce as a combined lens array and matched microimage print provides security value.

Aspects of the invention that use two different print e.g. ink workings still do not have tight register constraints on these elements or on their relative register to the microlens array.

One particularly advantageous approach to forming a document OVD (optically variable device) by entirely printing techniques apart from the creation of the initial plates is outlined below. First print down the micro-image arrays using one or more printing ink colours as appropriate to the technique being used. Print processes suitable for this type of resolution would for example be litho and intaglio printing. Then as a second stage form the overlaid microlens array: a preferred method would be to use an intaglio printing plate as an embossing would to form the lenses. Intaglio printing is a well known process by which raised profiled printed ink structures can be formed to provide a characteristic tactile level of security on documents of value. This process involves specialised inks and specialised print processes using engraved printing plates and high pressures to mould ink into a relief structure on & document. In this case the intaglio printing plate in the intaglio print process would consist of the negative surface relief profile of the spherical lens array required. The spherical lens array could then be formed in situ on the document by laying down a relatively thick layer of clear ink or varnish over the microimage area and then using the intaglio press to mould the lens array into this ink or varnish analogous no that used to form intaglio printed areas on documents. In this way the entire microlens plus microimage security device could be formed using printing processes alone.

It should be noted that the key advantage this technique has to offer over previous techniques based on cylindrical lenses is that the use of spherical microlenses and corresponding matched arrays of microimages permit relatively wide tolerances. In particular the moire "beat" pattern of images formed by the interaction of the lens array and the corresponding microimage array can be utilised to allow further degrees of wide tolerance register by deliberately using a device displaying multiple moire generated images.

Another method of mass producing image arrays instead of by ink printing is to form the image array by selectively removing areas from an aluminium film to form images. For example, etched micro print of this form is often incorporated into window thread metallic strips added as a thread to security paper such as those used for banknotes and other high value documents. These images are normally formed on an aluminised plastic film by either printing on an enchant solution to remove selective areas of aluminium to form images, or printing a protective layer on the aluminium then removing unprotected areas using an etch solution. Using either technique one could organize that an aluminium or other metal film in a paper thread carried an array of microimages by using a microimage plate for the initial printing. This would then enable a security paper window thread to carry a covert microimage revealable by overlaying it with a separate corresponding microlens array. One would also anticipate a process of producing a security device consisting of an integrated microlens array and corresponding image array to form a directly viewable security device by a process of embossing a microlens array relief profile into a suitable material (e.g. polyester), aluminising and then forming microimages in the aluminium layer by a print/etch process as outlined above to form a microlens security device that would be integrated into paper products as a window thread.

One would also use this type of process for forming a microimage array into the type of dot/half toned aluminium areas used to form the reflective layer in de-metallised holograms used for security overlays and overlaminates for example to protect photographs as is known elsewhere. So for instance a secure substantially transparent holographic overlaminate containing a holographic OVDeffect could also contain a covert microimage pattern formed within the shape or layout of the dons of aluminium forming the partially metallised layer which would be revealed using a microlens array overlay.

Alternative methods of integrating the lens array onto a document would include embossing or forming the lens array into a UV curable resin applied over the microimages (a process that would use considerably less pressure than intaglio print) and embossing the spherical lens arrays separately using conventional embossing equipment and transferring the embossed lens film to the document as a label or using hot stamping techniques.

For documents or plastic transaction cards and the like where the substrate is plastic there are other useful embodiments of this invention which enable the microlenses and corresponding microimages to be incorporated together. In this case the microlenses could be incorporated into one surface of a substantially optically clear plastic substrate, whilst the thickness of the substrate would provide the necessary separation from the microimage array which would be placed on the other side of the substrate (or within an inner layer of the substrate for the case of thicker plastic cards) and viewed through the substrate material. This would avoid the need for a raised area of microlenses as needed with documents and would enable the microlenses to be combined within the substrate either by using an embossing process before manufacture or during manufacture.

BRIEF DESCRIPTION OF THE DRAWINGS

Some examples of security devices according to the invention will now be described with reference to the accompanying drawings, in which:

FIGS. 3A and 3B illustrate a document carrying a security device, and the document when viewed through a microlens array respectively;

FIGS. 4A to 4C illustrate an example of the production of a security device;

FIG. 5 illustrates a further example of a security device; and,

DETAILED DESCRIPTION OF PREFERRED EMBODIMENTS

Figure 1A:
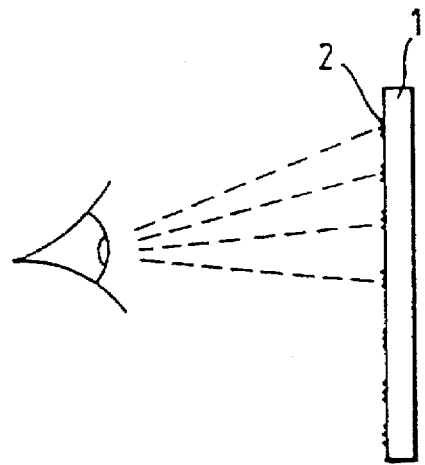
FIGS. 1A and 1B illustrate respectively in cross-section and in perspective view a security device when viewed normally.
Figure 1B:
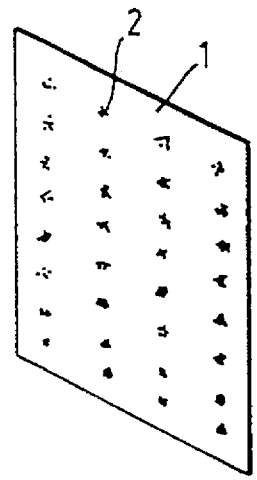

FIGS. 1A and 1B illustrate a substrate 1 carrying a two-dimensional array of microimages 2 (only one set of regularly spaced microimages being shown for clarity). The substrate 1 may comprise a security document, such as a banknote, or a separate substrate which is subsequently adhered via an adhesive (not shown) to a security document. Each microimage 2 within the array is substantially identical and typically has a dimension of up to 250 microns. Each microimage comprises an image with detail which can be resolved to say 5 or 10 microns. Typically, there will be many, e.g. mode than one hundred microimages provided per array.

Figure 1C:
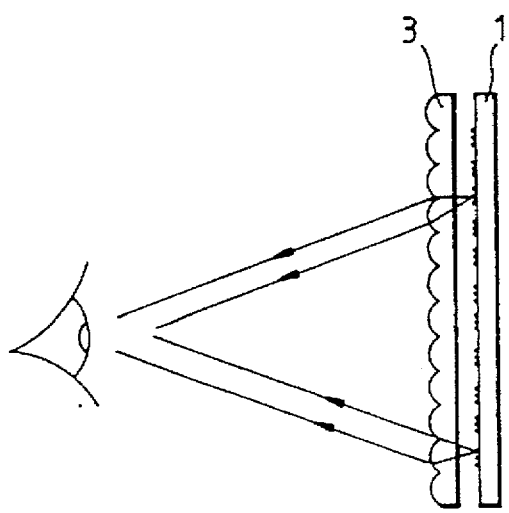
FIGS. 1C and 1D are similar to FIGS. 1A and 1B showing the security device when viewed through a microlens array viewer.
Figure 1D:
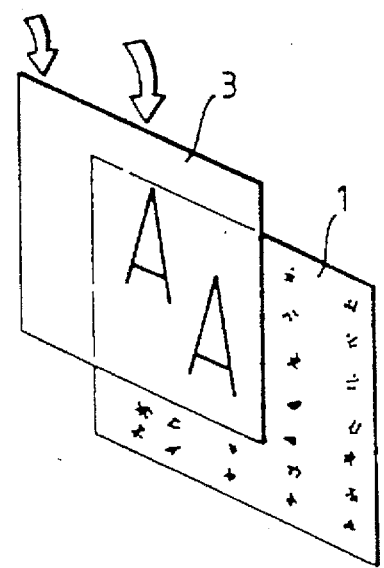
Figure 1E:
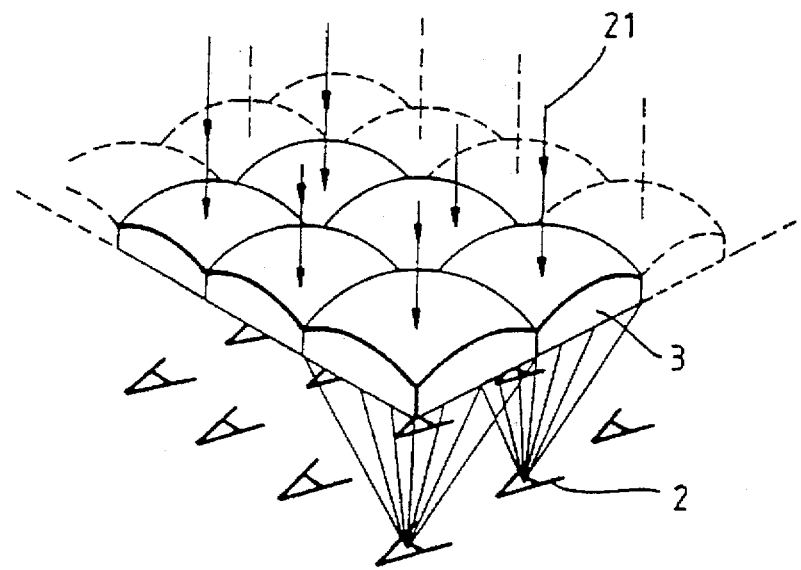
FIG. 1E is a schematic, perspective view of the arrangement shown in FIGS. 1C and 1D.

To the naked eye, the image recorded in each microimage will be unrecognisable as illustrated in FIG. 1B. However, when a matching array 3 of spherical microlenses is brought into alignment with the microimages as in FIGS. 1C and 1E the images will replay optically through the corresponding lenses when viewed in a direction 21 to generate magnified images as schematically shown in FIG. 1D. Mere the image recorded in each microimage within the array is the letter "A".

The viewer would need to align the analysing lenses 3 for focal length (i.e. planar separation) to bring the microimages 2 into focus and then correct for tilt and twist. The viewer will first see, as the analysing lenses are twisted into place, an array of many small images which gradually reduce in number to a few large images when the alignment is perfect.

This is effectively the visual equivalent of viewing a normally printed image such as a photograph. The effect can be used to provide an optical security device, as counterfeits will be readily detected.

Figure 2A:
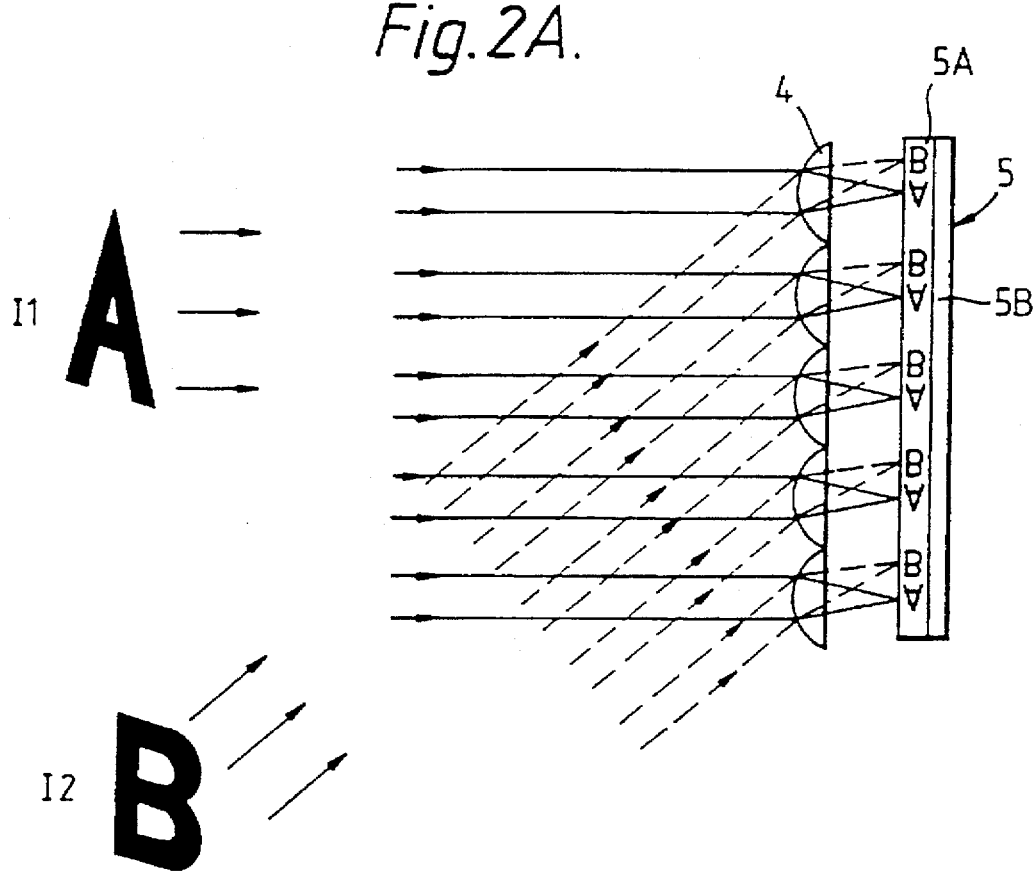
FIGS. 2A and 2B illustrate the recording and replay of a pair of images respectively.
Figure 2B:
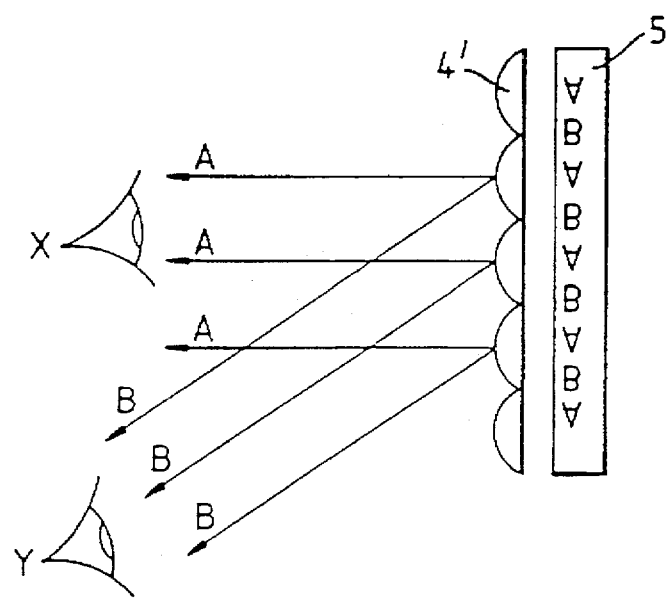

In the FIG. 1 example, each microimage 2 is identical. It is also possible, however, to record sets of microimages which define different images or different views of the same image in .order to achieve a three-dimensional image and/or switching or moving replay effects similar to those produced by holography. This is illustrated in FIG. 2. In this case, each lens of a lens array 4 records the different view point of an object I1 onto the photosensitive coating 5A on a substrate 5B. Object I2 is then recorded from a different angle. In this example, the different objects I1,I2 are the letters "A" and "B" respectively. When the array printed substrate 5 is viewed through a similar microlens array 4' (FIG. 2B) depth and movement effects will be visible as the viewer changes viewpoint from X to Y: the viewer will see I1 at position X and I2 at position Y.

FIG. 3 illustrates an example of a security document 6 incorporating a security device 7 similar to the devices shown in FIGS. 1 and 2. As indicated in FIG. 3A, the image used in the microimage array in the security device is not resolvable to the naked eye. The array will have typically been printed onto the substrate, such as paper, using standard ink printing techniques such as lithographic printing.

In order to inspect the security device 7, a microlens array 8 is laid over the security device 7 causing the microimages to reconstruct and generate magnified images as shown in FIG. 3B. Typically, the microlens array 8 will be provided in a reader device (not shown) into which the document 6 is inserted.

To create a hidden security print feature as in FIG.3 typically requires the creation of a master printing plate consisting of an array of microimages—preferably formed by imaging one or more sets of graphics down onto a high resolution photosensitive recording medium via a microlens array.

This results in a regularly spaced array of microscopic images of minimum detail size around 5μ, and typically of maximum image size 100–200μ. These images and the detailing would not be viewable by unaided eye. This pattern could also be created by using direct write photomask manufacturing techniques as used in the semiconductor industry.

The printing of the microimage pattern on the plate onto a security document or plastic card, etc., would use standard security printing methods e.g. lithographic or intaglio printing which are capable of producing high resolution printing detail to as small as 5 to 10 microns.

This would then form a security document comprising a covert array of microscopic images unrecognisable to the unaided eye and so small as to be substantially non-discernible using standard hand magnifiers, etc. This array of microimages may be revealed by overlaying it with the array of microlenses 8, probably supplied as an embossed transparent plastic sheet which has an array of surface relief microlenses. When the viewing sheet is properly aligned the eye would see a vastly magnified image of the original microscopic image in the array, which would exhibit characteristic depth and movement effects. Using slightly more sophisticated multiple exposure techniques at the origination stage would also allow this image to "flip" or switch between two or more different graphical images, coloured images or lines to give an optically variable switching effect on tilting the device during inspection for authenticity.

One method of manufacturing a security device is shown in FIG. 4.

An array of one or more sets of microimages 11 (FIG. 4A) would be printed onto a security document substrate 10 using conventional printing technology such as intaglio printing.

The print 11 is then overlaid with a transparent polymeric resin material 12 (FIG. 4B) and then a corresponding array of microlenses 13 is formed either e.g. by embossing with a stamper, or using a UV curable composition or by using a casting/curing process in situ (FIG. 4C). Alternatively an array of pre-formed microlenses could be applied over the print using transfer techniques as currently used in the holographic and print industry (e.g., hot stamping foil).

However, the preferred route would be to form the corresponding microlenses in situ either by moulding the transparent plastic with an uninked intaglio plate on a printing press, or by a casting approach. This would involve overcoating the print feature 11 with a transparent curable material 12 and then forming the microlens array into the surface of this transparent material using an uninked intaglio printing plate or an embossing mould 14 and then, after removing any solvent, curing the material using UV light, electron beams or similar techniques to polymerise and cure the layer. Optionally the microlenses may be replaced by a diffractire microlens (i.e. a holographic optical element) applied or formed by the same in-situ moulding process or applied as standard hot stamping foil or similar.

FIG. 5 illustrates another approach applicable to plastics substrates in which microimages 15 (one shown for clarity) are printed on one side of a plastics substrate 16 which is transparent while microlenses 17 are cast or moulded into the other side of the substrate 16. The substrate thickness is used as the optical spacer required to allow the image recorded in the microimages to be recognisable through the lenses. The substrate in other areas may be provided with an opacifying coating 17 which could then be printed over with security indicia.

Figure 6:
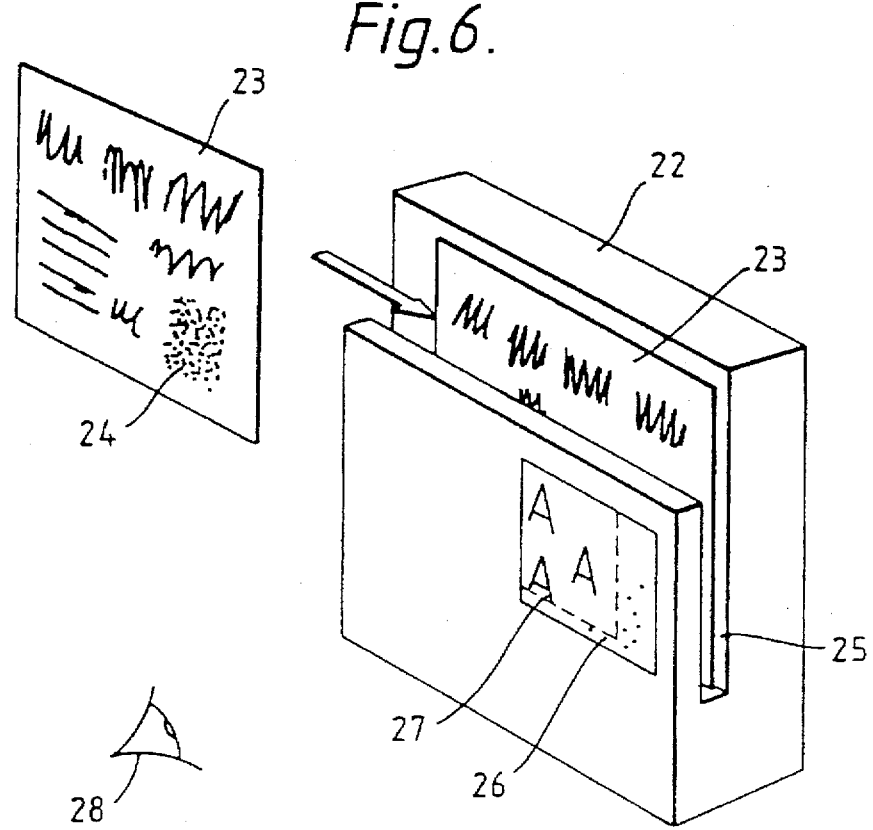
FIG. 6 illustrates a security document holder.

FIG. 6 shows a document holder 22 to enable a security device easily to be authenticated, The security document holder 22 has an arrangement 25 such as a slot or spring loader assembly for locating a security document 23 having a microimage security device 24 substantially in register with a set of microlenses 26 located within the document holder such that the security device can be viewed through the corresponding microlens array 26 to form a magnified image 27 for verification by an observer 28.

We claim:

1. A security device comprising a regular two dimensional array of substantially identical printed microimages, each of the microimages having a dimension of up to about 250 μm and which, when viewed through a two dimensional array of substantially spherical microlenses having substantially a same pitch as the array of microimages, each microlens having a diameter in the range of substantially 50–250 μm, generate at least one magnified version of one of the microimages when the array of microimages and the array of microlenses are at least partially registered.

2. A security device according to claim 1, wherein the microimages have been printed with ink.

3. A security device according to claim 2, wherein the microimages have been lithographically or intaglio printed.

4. A security device according to claim 1, further comprising a two dimensional array of substantially spherical microlenses having substantially a same pitch as the array of microimages, each of the microlenses having a diameter in the range of substantially 50–250 μm secured over the array of microimages to generate at least one magnified version of one of the microimages when the array of microimages and the array of microlenses are at least partially registered.

5. A security device according to claim 4, wherein the array of microlenses is formed in a transparent polymeric composition.

6. A security device according to claim 5, wherein the transparent polymeric array composition is colored.

7. A security device according to claim 6, wherein the microlens array is transparent and provided with stripes of different colors.

8. A security device according to claim 1, wherein the array of microimages includes a plurality of sets of microimages, and wherein the microimages within each of the sets are the same while the microimages of each of the sets differ from the microimages of other ones of the sets.

9. A security device according to claim 8, wherein different ones of the microimages define different views of a same image.

10. A security device according to claim 8, further comprising a two-dimensional array of substantially spherical microlenses having substantially a same pitch as the array of microimages, each of the microlenses having a diameter in the range of substantially 50–250 μm secured over the array of microimages to generate at least one magnified version of one of the microimages when the array of microimages and the array of microlenses are at least partially registered, wherein the array of microimages includes at least two sets of microimages, at least one of the sets of microimages having a pitch different from a pitch of the microlens array such that each magnified version of one of the microimages includes at least two elements moving at different apparent rates and forming different numbers magnified images of each element.

11. A device according to claim 8, wherein each of the sets of microimages is differently colored.

12. A security device according to claim 1, wherein the microlenses comprise astigmatic spherical lenses having different focal lengths in mutually orthogonal directions around the optical axis.

13. A security device comprising an optical device exhibiting an optically variable image, the optically variable device further including a two dimensional array of substantially identical microimages, each of the microimages having a dimension of up to about 250 μm and which, when viewed through a two dimensional array of substantially spherical microlenses having substantially a same pitch as the array of microimages, each microlens having a diameter in the range of substantially 50–250 μm, generate at least one magnified version of one of the microimages when the array of microimages and the array of microlenses are at least partially registered.

14. A security device according to claim 13, wherein the optically variable image comprises a hologram.

15. A security device according to claim 14, wherein the hologram is formed by a surface relief pattern.

16. A security device according to claim 13, wherein the microimages are provided as a surface relief.

17. A security device according to claim 13, further comprising a two dimensional array of substantially spherical microlenses having substantially a same pitch as the array of microimages, each of the microlenses having a diameter in the range of substantially 50–250 μm secured over the array of microimages to generate at least one magnified version of one of the microimages when the array of microimages and the array of microlenses are at least partially registered.

18. A security device according to claim 17, wherein the array of microlenses is formed in a transparent polymeric composition.

19. A security device according to claim 18, wherein the transparent polymeric composition is colored.

20. A security device according to claim 19, wherein the microlens array is transparent and provided with stripes of different colors.

21. A security device according to claim 17, comprising a transparent substrate on one side of which is provided the array of microlenses and on the other side of which is provided the array of microimages.

22. A security device according to claim 21, wherein the transparent substrate is plastics.

23. A security device according to claim 13, wherein the microlenses comprise astigmatic spherical lenses having different focal lengths in mutually orthogonal directions around the optical axis.

24. A security device according to claim 13, wherein the array of microimages includes a plurality of sets of microimages, and wherein the microimages within each of the sets are the same while the microimages of each of the sets differ from the microimages of other ones of the sets.

25. A security device according to claim 24, wherein the different ones of the microimages define different views of a same image.

26. A security device according to claim 24, further comprising a two-dimensional array of substantially spherical microlenses having substantially a same pitch as the array of microimages, each of the microlenses having a diameter in the range of substantially 50–250 μm secured over the array of microimages to generate at least one magnified version of one of the microimages when the array of microimages and the array of microlenses are at least partially registered, wherein the array of microimages includes at least two sets of microimages, at least one of the sets of microimages having a pitch different from a pitch of the microlens array such that each magnified version of one of the microimages includes at least two elements moving at different apparent rates and forming different numbers of magnified images of each element.

27. A security device according to claim 24, further comprising a two-dimensional array of substantially spherical microlenses having substantially a same pitch as the array of microimages, each of the microlenses having a diameter in the range of substantially 50–250 μm secured over the array of microimages to generate at least one magnified version of one of the microimages when the array of microimages and the array of microlenses are at least partially registered, wherein the array of microimages includes at least two sets of microimages, at least one of the sets of microimages having a pitch different from a pitch of the microlens array such that each magnified version of one of the microimages includes at least two elements moving at different apparent rates and forming different numbers of magnified images of each element.

28. A method of preparing a record medium for use in producing a security device, the method comprising imaging an object or image onto the record medium through a regular two dimensional array of substantially spherical microlenses, each of the microlens having a diameter in the range of substantially 50–250 μm, so as to record a two dimensional array of substantially identical microimages, each of the microimages having a dimension of up to about 250 μm and having substantially a same pitch as a pitch of the array of microlenses.

29. A method according to claim 28, wherein the record medium comprises a printing plate.

30. A method according to claim 28, wherein the imaging step comprises imaging the object or image onto a record medium through a plurality of different two dimensional arrays of substantially spherical microlenses, each of the microlens having a diameter in the range of substantially 50–250 μm.

31. A method according to claim 30, wherein the image or object is imaged through two of said arrays of substantially spherical microlenses.

32. A method according to claim 30, wherein pitches of the arrays of microlens vary by between 5 and 50%.

33. A method according to claim 32, wherein the variation in the pitches is substantially 20%.

34. A method of manufacturing a security device, the method comprising:
  printing a regular two dimensional array of substantially identical microimages on a record medium, each of the microimages having a dimension up to about 250 μm; and
  securing over the array of microimages, a two dimensional array of substantially spherical microlenses having substantially a same pitch as the array of microimages, each of the microlens having a diameter in the range of substantially 50–250 μm, such that on viewing, at least one magnified version of one of the microimages is visible when the array of microimages and the array of microlenses are at least partially registered.

35. A method according to claim 34, wherein an allowable tolerance during the securing step between the array of microimages and the array of microlenses is in a range of between 0.25–0.5 mm.

36. A method according to claim 34, wherein the printing step comprises a lithographic or intaglio process.

37. A method according to claim 34, wherein step of securing an array of substantially spherical microlenses comprises laying a transparent medium on the record medium, and forming the array of microlenses in the transparent medium.

38. A method according to claim 37, wherein the forming step comprises an intaglio process.

39. A security document carrying a security device, the security device comprising a regular two dimensional array of substantially identical printed microimages, each of the microimages having a dimension of up to about 250 μm and which, When viewed through a two dimensional array of substantially spherical microlenses having substantially a same pitch as the array of microimages, each microlens having a diameter in the range of substantially 50–250 μm, generate at least one magnified version of one of the microimages when the array of microimages and the array of microlenses are at least martially registered.

40. A security document carrying a security device, the security device comprising an optically variable device exhibiting an optically variable image, the optically variable device further including a two dimensional array of substantially identical microimages, each of the microimages having a dimension of up to about 250 μm and which, when viewed through a two dimensional array of substantially spherical microlenses having substantially a same pitch as the array of microimages, each microlens having a diameter in the range of substantially 50–250 μm, generate at least one magnified version of one of the microimages when the array of microimages and the array of microlenses are at least partially registered.

41. A security document carrying a security device, the security device comprising a record medium, the record medium being prepared by a method comprising imaging an object or image onto the record medium through a regular two dimensional array of substantially spherical microlenses, each of the microlens having a diameter in the range of substantially 50–250 μm, so as to record a two dimensional array of substantially identical microimages, each of the microimages having a dimension of up to about 250 μm and having substantially a same pitch as a pitch of the array of microlenses.

42. A security document carrying a security device, the security device being manufactured by a method comprising:
  printing a regular two dimensional array of substantially identical microimages on a record medium, each of the microimages having a dimension up to about 230 μm; and
  securing over the array of microimages, a two dimensional array of substantially spherical microlenses having substantially a same pitch as the array of microimages, each of the microlens having a diameter in the range of substantially 50–250 μm, such that on viewing, at least one magnified version of one of the microimages is visible when the array of microimages and the array of microlenses are at least partially registered.

43. A method of authenticating a security device, the security device including a regular two dimensional array of substantially identical printed microimages, each of the microimages having a dimension of up to about 250 μm, the method comprising:
  positioning a two dimensional array of substantially spherical microlenses having substantially a same pitch as a pitch of the array of microimages, each of the microlenses having a diameter in the range of substantially 50–250 μm, over the security device; and
  viewing the security device through the array of microlenses.

44. A method of authenticating a security device, the wherein security device an optically variable device exhibiting an optically variable image, the optically variable device further including a two dimensional array of substantially identical microimages, each of the microimages having a dimension of up to about 250 μm, the method comprising:
  positioning a two dimensional array of substantially spherical microlenses having substantially a same pitch as a pitch of the array of microimages, each of the microlenses having a diameter in the range of substantially 50–250 μm, over the security device; and
  viewing the security device through the array of microlenses.

45. A security device reader comprising:

a two dimensional array of substantially spherical microlenses, each of the microlenses having a diameter in the range substantially 50–250 μm; and a security document holder for locating a security document having a security device, the security device comprising a regular two dimensional array of substantially identical printed microimages, each of the microimages having a dimension of up to about 250 μm and which, when viewed through the two dimensional array of substantially spherical microlenses having substantially a same pitch as the array of microimages, generate at least one magnified version of one of the microimages when the array of microimages and the array of microlenses are at least partially registered.

46. A reader according to claim 45, wherein the array of microlenses and the security document holder are relatively rotatable, the axis of rotation being normal to a plane defined by the array of microlenses.

* * * * *